United States Patent
Rasch (10) Patent No.: US 12,361,271 B2
(45) Date of Patent: Jul. 15, 2025

(54) OPTIMIZING DEEP NEURAL NETWORK MAPPING FOR INFERENCE ON ANALOG RESISTIVE PROCESSING UNIT ARRAYS

(71) Applicant: International Business Machines Corporation, Armonk, NY (US)

(72) Inventor: Malte Johannes Rasch, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 17/338,910

(22) Filed: Jun. 4, 2021

(65) Prior Publication Data

US 2022/0391688 A1 Dec. 8, 2022

(51) Int. Cl.
| G06N 3/06 | (2006.01) |
| G06N 3/04 | (2023.01) |
| G06N 3/065 | (2023.01) |
| G06N 3/08 | (2023.01) |

(52) U.S. Cl.
CPC ............ *G06N 3/065* (2023.01); *G06N 3/04* (2013.01); *G06N 3/08* (2013.01)

(58) Field of Classification Search
CPC ............ G06N 3/08; G06N 3/04; G06N 3/065; G06N 3/084
See application file for complete search history.

(56) References Cited

U.S. PATENT DOCUMENTS

| 9,646,243 | B1 | 5/2017 | Gokmen | |
| 2018/0005110 | A1* | 1/2018 | Gokmen | G06N 3/063 |
| 2019/0147327 | A1 | 5/2019 | Martin | |
| 2020/0082255 | A1 | 3/2020 | Kataeva | |
| 2021/0279556 | A1* | 9/2021 | Gokmen | G11C 13/004 |
| 2021/0326685 | A1* | 10/2021 | Lee | G06N 3/065 |
| 2022/0101142 | A1* | 3/2022 | Tsai | G06N 3/048 |

OTHER PUBLICATIONS

Rasch, M. J., Gokmen, T., & Haensch, W. (2019). Training large-scale artificial neural networks on simulated resistive crossbar arrays. IEEE Design & Test, 37(2), 19-29. (Year: 2019).*
Gokmen, T., Onen, M., & Haensch, W. (2017). Training deep convolutional neural networks with resistive cross-point devices. Frontiers in neuroscience, 11, 538. (Year: 2017).*

(Continued)

*Primary Examiner* — Paul M Knight
(74) *Attorney, Agent, or Firm* — Kimberly Zillig; Ryan, Mason & Lewis, LLP (57) ABSTRACT

A computer-implemented method, computer program product, and/or computer system that performs the following operations: (i) receiving a deep neural network (DNN) having a set of inputs nodes, a set of output nodes, and a set of weight parameters; (ii) configuring the DNN for application to a set of analog resistive processing unit (RPU) arrays, the configuring including applying a set of modifiers to respective outputs of the set of output nodes, the set of modifiers corresponding to the set of analog RPU arrays; (iii) training the DNN using a training process, the training yielding an updated set of weight parameters and an updated set of modifiers; and (iv) transferring the updated set of weight parameters and the updated set of modifiers to the set of analog RPU arrays.

20 Claims, 4 Drawing Sheets

(56) References Cited

OTHER PUBLICATIONS

He, Z., Lin, J., Ewetz, R., Yuan, J. S., & Fan, D. (Jun. 2019). Noise injection adaption: End-to-end ReRAM crossbar non-ideal effect adaption for neural network mapping. In Proceedings of the 56th Annual Design Automation Conference 2019 (pp. 1-6). (Year: 2019).*
Song, Z., Sun, Y., Chen, L., Li, T., Jing, N., Liang, X., & Jiang, L. (Apr. 21, 2020). ITT-RNA: Imperfection tolerable training for RRAM-crossbar-based deep neural-network accelerator. IEEE Transactions on Computer-Aided Design of Integrated Circuits and Systems, 40(1), 129-142. (Year: 2020).*
Chakraborty, I., Ali, M. F., Kim, D. E., Ankit, A., & Roy, K. (Jul. 2020). Geniex: A generalized approach to emulating non-ideality in memristive xbars using neural networks. In 2020 57th ACM/IEEE Design Automation Conference (DAC) (pp. 1-6). IEEE. (Year: 2020).*
Tsai, H., Ambrogio, S., Narayanan, P., Shelby, R. M., & Burr, G. W. (2018). Recent progress in analog memory-based accelerators for deep learning. Journal of Physics D: Applied Physics, 51(28), 283001. (as cited by the IDS on Jun. 4, 2021)(Year: 2018).*
NPL Gokmen Acceleration of DNN Training Resistive Cross Point 2016.*
NPL Gokmen Training Deep CNNs with Resistive Cross Point Devices 2017.*
NPL Gokmen Training LSTM Networks with Resistive 2018.*
NPL Gokmen Training NNs on Resistive Device Arrays 2020.*
NPL Haensch The Next Generation of Deep Learning Hardware 2019.*
NPL Jain CxDNN Hardware software Compensation Methods for DNNs 2019.*
NPL Lopez Coarse Grained Reconfigurable Computing Mar. 2021.*
NPL Rash Inventor Training Large Scale ANNs on Simulated RCAs Apr. 2020.*
NPL Tsai Recent progress in analog memory based Accelerators 2018.*
Gokmen et al., "Acceleration of Deep Neural Network Training with Resistive Cross-Point Devices: Design Considerations", Frontiers in Neuroscience, vol. 10, Article 333, published: Jul. 21, 2016, 13 pages, <https://doi.org/10.3389/fnins.2016.00333>.
Joshi et al., "Accurate deep neural network inference using computational phase-change memory", Nature Communications, Published: May 18, 2020, 13 pages, <https://doi.org/10.1038/s41467-020-16108-9>.
Kazemi et al., "A Device Non-Ideality Resilient Approach for Mapping Neural Networks to Crossbar Arrays", In 2020 57th ACM/IEEE Design Automation Conference (DAC), 6 pages, © 2020 IEEE.
Kendall et al., "Training End-to-End Analog Neural Networks with Equilibrium Propagation", arXiv:2006.01981v2 [cs.NE] Jun. 9, 2020, 31 pages.
Kim et al., "Zero-Shifting Technique for Deep Neural Network Training on Resistive Cross-point Arrays", arXiv:1907.10228v2 [cs.ET], last revised Aug. 2, 2019 (this version, v2), 27 pages, <https://arxiv.org/abs/1907.10228>.
Tsai et al., "Recent progress in analog memory-based accelerators for deep learning", Journal of Physics D: Applied Physics, 51 (2018) 283001, Published Jun. 21, 2018, 28 pages, <https://doi.org/10.1088/1361-6463/aac8a5>.

* cited by examiner

OPTIMIZING DEEP NEURAL NETWORK MAPPING FOR INFERENCE ON ANALOG RESISTIVE PROCESSING UNIT ARRAYS

BACKGROUND

The present invention relates generally to the field of neuromorphic computing, and more particularly to the mapping of deep neural networks to neuromorphic computing devices that include analog arrays of resistive processing unit (RPU) devices.

Neuromorphic computing generally involves the use of computer technology to mimic neuro-biological architectures present in the nervous system. As an example, an artificial neural network (ANN) is a type of neuromorphic computing system having nodes that generally mimic neurons and connections between the nodes that generally mimic synapses, with the connections between the nodes having respective synaptic weights.

A deep neural network (DNN) is an ANN with multiple layers between input and output layers. One way of implementing a DNN is by utilizing one or more analog crossbar arrays of memory devices such as resistive processing units (RPUs). In some implementations, analog RPU arrays are combined with digital processing units and additional memory in what is generally referred to as a "mixed-precision" architecture.

SUMMARY

According to an aspect of the present invention, there is a method, computer program product and/or system that performs the following operations (not necessarily in the following order): (i) receiving a deep neural network (DNN) having a set of inputs nodes, a set of output nodes, and a set of weight parameters; (ii) configuring the DNN for application to a set of analog resistive processing unit (RPU) arrays, the configuring including applying a set of modifiers to respective outputs of the set of output nodes, the set of modifiers corresponding to the set of analog RPU arrays; (iii) training the DNN using a training process, the training yielding an updated set of weight parameters and an updated set of modifiers; and (iv) transferring the updated set of weight parameters and the updated set of modifiers to the set of analog RPU arrays.

DETAILED DESCRIPTION

In various deep neural network (DNN) architectures, DNNs that are stored on digital processing units (e.g., "traditional" computer processors) may be transferred to one or more analog resistive processing unit (RPU) arrays for processing. For example, a DNN may be trained or otherwise updated on a digital processing unit but ultimately executed (in a process commonly referred to as "inference") on a set of analog RPU arrays. However, while executing a DNN on analog hardware has its various benefits, the mapping of digital DNN weights to analog conductance values can be problematic—particularly given the limited output ranges and generally noisy behavior of various analog devices. Embodiments of the present invention address these deficiencies by performing a hardware aware (HWA) pre-training of a DNN in digital, incorporating various hardware specific parameters/customizations of a set of analog RPU arrays into a digital representation of a DNN prior to training. In this way, as will be discussed in further detail below, embodiments of the present invention provide for a more optimized weight to conductance mapping that provides for a more accurate analog DNN inference.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
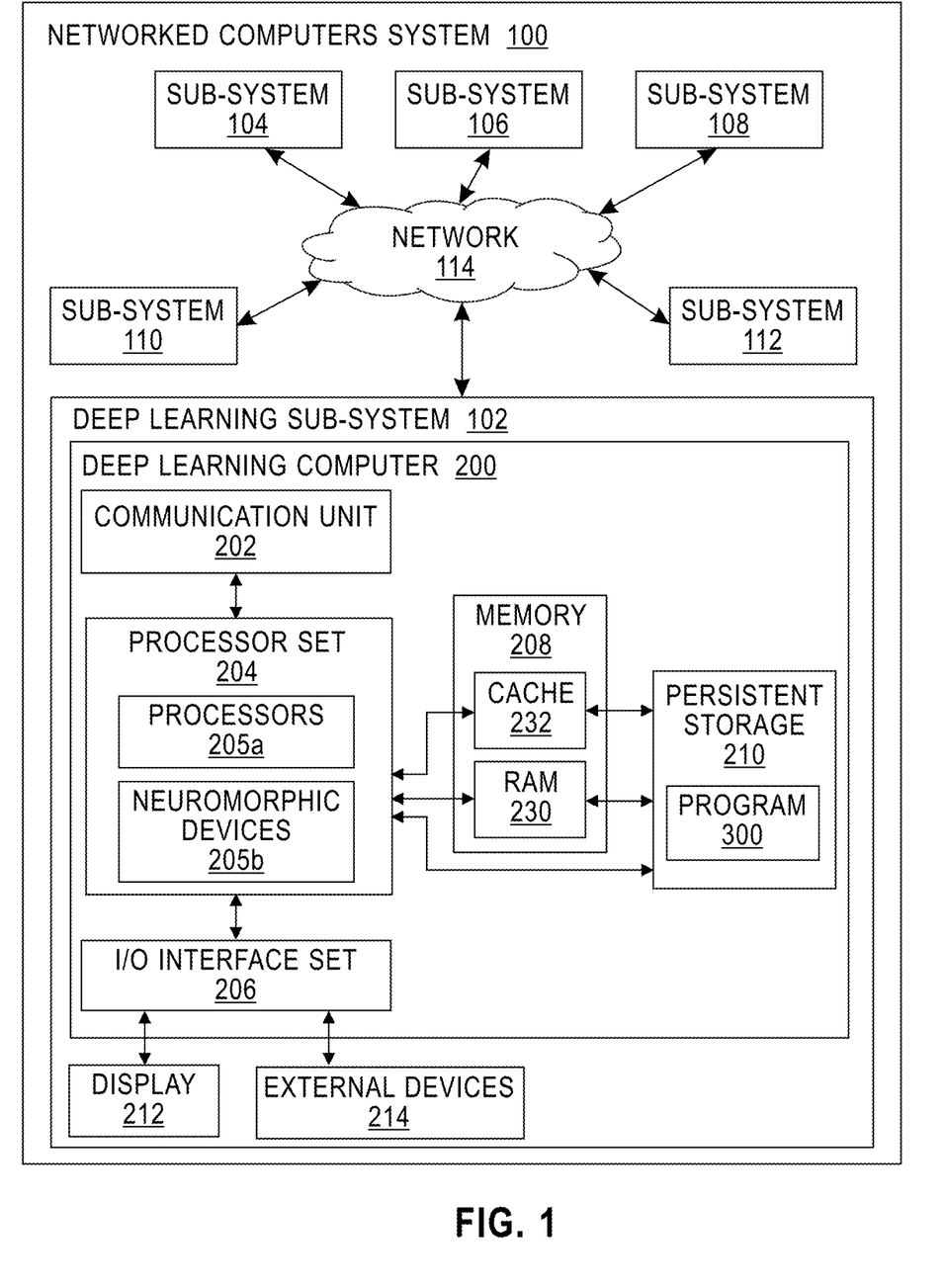
FIG. 1 is a block diagram view of a first embodiment of a system, according to the present invention.

An embodiment of a possible hardware and software environment for software and/or methods according to the present invention will now be described in detail with reference to the Figures. FIG. 1 is a functional block diagram illustrating various portions of networked computers system 100, including: deep learning sub-system 102; deep learning sub-systems 104, 106, 108, 110, 112; communication network 114; deep learning computer 200; communication unit 202; processor set 204, including computer processors 20 a and neuromorphic devices 205b; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more processors of processor set 204, including respective subsets of computer processors 205a and/or neuromorphic devices 205b, usually through one or more memories of memory 208. In some embodiments, some or all of program 300 may be included on and/or operated by computer processors 205a, in some embodiments some or all of program 300 may be included on and/or operated by neuromorphic devices 205b, and in some embodiments a combination of computer processors 205a and neuromorphic devices 205b may be used.

While computer processors 205a generally include mostly "conventional" computer processors, neuromorphic devices 205b include analog neuromorphic devices such as RPU crossbar arrays. Generally speaking, RPU crossbar arrays are high density, low cost circuit architectures used to model DNNs. The crossbar array configuration includes a set of conductive row wires and a set of conductive column wires formed to intersect the set of conductive row wires. The intersections between the row wires and the column wires are separated by crosspoint devices—in this case, RPUs—which may be formed from thin film material. These crosspoint devices function as the weighted connections between neurons in a DNN. The RPUs themselves include resistive memory devices such as resistive random-access memory (ReRAM) devices, phase-change memory (PCM) devices, and the like, which have a tunable conductance which represents the synaptic weights and can be used to perform various DNN-related calculations. In various embodiments, each RPU crossbar array of neuromorphic devices 205b corresponds to a different respective layer of a DNN, such that the DNN as a whole is represented by a set of RPU crossbar arrays (one for each layer). In other embodiments, a single layer of a DNN may span multiple RPU crossbar arrays, or alternatively, multiple layers of a DNN may be represented by a single RPU crossbar array.

Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with deep learning computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
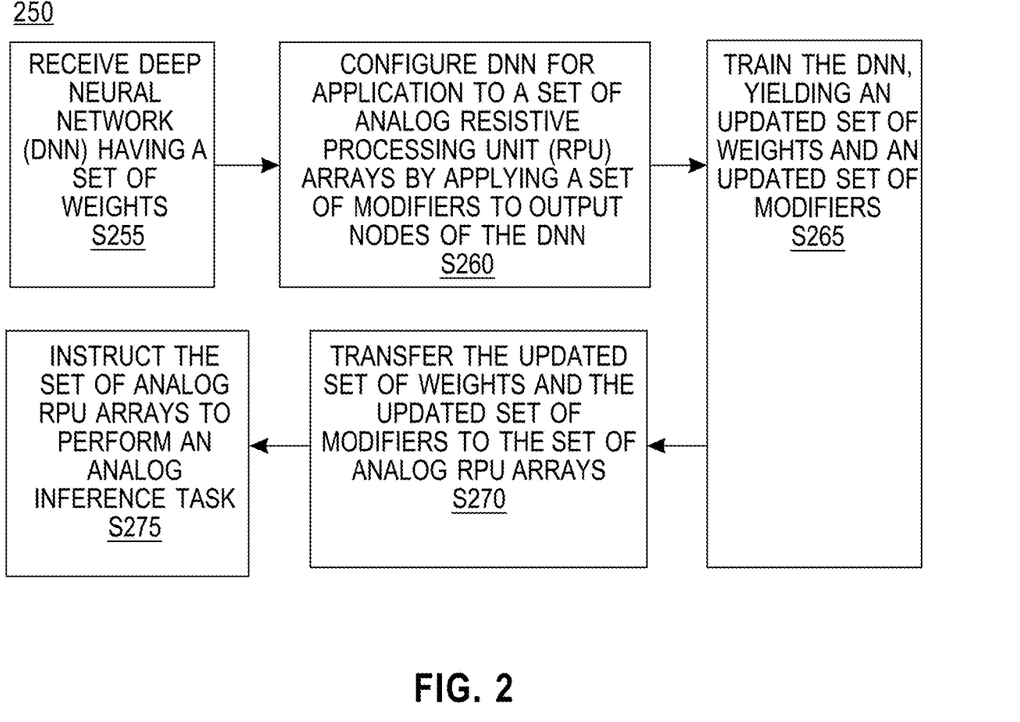
FIG. 2 is a flowchart showing a first embodiment method performed, at least in part, by the first embodiment system.
Figure 3:
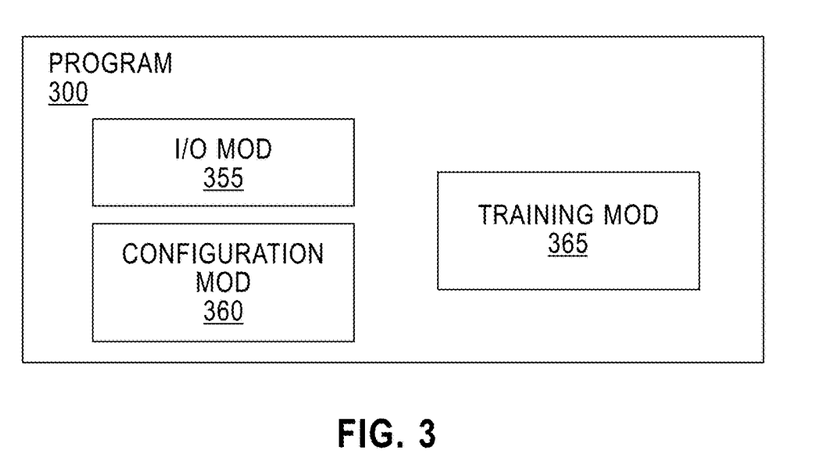
FIG. 3 is a block diagram showing a machine logic (for example, software) portion of the first embodiment system.

FIG. 2 shows flowchart 250 depicting a method, according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Generally speaking, in this example embodiment (also referred to in this sub-section as the "present embodiment," the "present example," the "present example embodiment," and the like), program 300 includes various operations performed by computer processors 205a (see FIG. 1) to prepare and/or train a DNN for execution on a set of analog RPU arrays (not shown) of neuromorphic devices 205b (see FIG. 1). It should be noted that this example embodiment is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

The DNN of the present example embodiment includes several layers of weighted nodes, as well a layer of input nodes and a layer of output nodes. When the DNN is stored in digital for use by computer processors 205a, the DNN is generally stored in floating point format on persistent storage 210, RAM 230, and/or cache 232. When the DNN is stored on analog hardware, it is stored on a set of analog RPU arrays, one for each layer of the DNN, of neuromorphic devices 205b. In this embodiment, each analog RPU array of the set of analog RPU arrays includes several rows and columns of weighted nodes (i.e., RPU devices) having conductance values representing their respective weights.

In alternate embodiments, each layer of the DNN may correspond to multiple analog RPU arrays, or multiple layers of the DNN may correspond to a single analog RPU array—for example, all of the layers of the DNN may be implemented on a single analog RPU array. And while FIG. 1 depicts neuromorphic devices 205b as being located within processor set 204 of deep learning computer 200 on deep learning sub-system 102, in other embodiments the various analog RPU arrays used to implement the DNN are distributed across several such sub-systems—for example, on sub-systems 104, 106, 108, 110, and/or 112.

The training of the DNN—which, in the present example embodiment, occurs on a digital processing unit of computer processors 205a—uses stochastic gradient descent (SGD), in which the weight (sometimes also referred to as an "error gradient") of each node is calculated using backpropagation. Backpropagation generally includes sequentially processing each layer of the DNN through multiple parts of a three-part training process that includes a forward pass, a backward pass, and a weight update pass (or simply an "update pass"), with each pass having respective calculations that are performed. The three-part process is typically repeated until a convergence criterion is met.

After the DNN has been trained in digital, it is transferred to the set of analog RPU arrays of neuromorphic devices 205b for execution (or "inference"). When transferring the DNN from the digital processing unit of computer processors 205a to the analog RPU arrays of neuromorphic devices 205b, program 300 converts the digital node weights (or "weight parameters") of the DNN to analog conductance values corresponding to the RPU devices of the analog RPU array.

The inference step, performed on the set of analog RPU arrays of neuromorphic devices 205b, includes a single forward pass (as opposed to the three-part backpropagation process) where matrix-vector multiplications are performed to transform a set of analog inputs (converted from digital inputs by a digital to analog (DA) converter such as DA converter 404 of FIG. 4, see below) into a set of analog outputs. In the present example embodiment, each analog output of the inference step is converted to digital by an analog to digital (AD) converter (such as AD converter 412 of FIG. 4, see below) and then modified by a set of modifiers (for example, digital scales and biases unique to each output column, to compensate for hardware particularities of the particular RPU array. As will be discussed below, the operations of program 300 take these modifiers into account when training the DNN in digital, thereby customizing the DNN for the particular hardware that the DNN is expected to be executed on.

Processing begins at operation S255, where I/O module ("mod") 355 receives a deep neural network (DNN) having a set of weights (or "weight parameters") corresponding to respective nodes of the DNN. The DNN also includes a set of input nodes for providing input to the DNN and a set of output nodes for producing outputs, where inputs provided at the input nodes are processed through several middle layers, having respective weights of the set of weights, and ultimately outputted at the output nodes. Any of a wide variety of DNN configurations may ultimately be utilized in this operation—including those now known and those yet to be developed—assuming that the underlying DNN at least includes: (i) node weights that can be adjusted via training, and (ii) a set of output nodes whose outputs can be modified in a customizable manner to better correspond to the outputs produced by a corresponding set of analog hardware.

Processing proceeds to operation S260, where configuration mod 360 configures the DNN for application to the set of analog RPU arrays by applying a set of modifiers to respective outputs of the set of output nodes. More specifically, in this operation, configuration mod 360 takes the modifiers discussed above with respect to the set of analog RPU arrays and applies them to the digital embodiment of the DNN—that is, for each modifier applied to each respective output node/column of the set of analog RPU arrays, configuration mod 360 applies a corresponding modifier to the respective output node of the DNN.

The modifiers, as described herein, may include any of a wide variety of elements that are useful in tuning the accuracy and performance of analog RPU array hardware. For example, in some embodiments—including the present example embodiment—the modifiers include a set of affine transformations such as scale and shift factors (also referred to as "linear scaling factors" and "bias terms," respectively), unique to each output node/column, that help compensate for drift variability as well as random conductance variations across devices. Other types of affine transformation (including translations, rotations, mappings, and the like), or modifiers in general, may be utilized, including those now known and those yet to be developed in the future.

In some cases, applying the modifiers to the outputs of the set of output nodes is essentially a one-to-one mapping—given that the modifiers applied to the set of analog RPU arrays are already applied to digital outputs, they can generally be ported over to the digital representation of the DNN without much complication. In other cases, various other transformations may be applied to better port the analog modifiers to their digital counterparts.

In various embodiments, the configuration of operation S260 includes one or more other operations in addition to the applying of the modifiers. For example, various embodiments also convert the digital representation of the DNN to a format that more closely replicates the particular hardware configuration of the set of analog RPU arrays—for example, by recreating the row/column array configuration in a digital format for each layer of the DNN. These (and other) embodiments may also include mapping the set of weights to a set of conductance values corresponding to the set of analog RPU arrays, and/or clipping ranges of the set of input nodes, the set of output nodes, and the set of weight parameters according to respective conductance ranges and/or weights of the set of analog RPU arrays. In still other (or the same) embodiments, operation S260 may quantize the input nodes and the output nodes, according to analog to digital (AD) conversions and digital to analog (DA) conversions that happen on the set of analog RPU arrays, and/or add other expected noise sources of the analog RPU arrays to the set of input nodes, the set of output nodes, and/or the set of weights of the digital representation. Because various embodiments of the present invention aim to improve the mapping of a DNN from digital to analog, these and other configurations that help to more closely model the analog hardware in digital—both known and yet to be developed—may be utilized.

Processing proceeds to operation S265, where training mod 365 trains the DNN, in digital, yielding an updated set of weights and an updated set of modifiers. In this embodiment, training mod 365 utilizes stochastic gradient descent—and more particularly, backpropagation—using a set of training data that includes training inputs and training outputs. In other embodiments, any of a wide variety of training methods may be utilized, with the primary goal being that both the weights and the modifiers are updated as part of training. While updating weights during DNN training is fairly conventional, the addition of modifier updates—particularly, updates to modifiers (such as scaling factors and bias terms) tailored to specific analog hardware that the DNN is expected to be executed on—provides a substantial improvement over known training processes.

In various embodiments, the training further includes, upon completion of each training epoch (or some other predetermined iteration), remapping the set of weights, in digital, to an updated set of conductance values corresponding to the set of analog RPU arrays. By remapping the weights one or more times during training of the DNN in digital, various embodiments of the present invention further optimize the weight to conductance mapping over existing configurations.

Processing proceeds to operation S270, where I/O mod 355 transfers the updated set of weights and the updated set of modifiers to the set of analog RPU arrays. In various embodiments, prior to the transfer, the weights are converted to conductance values for application to the set of analog RPU arrays—for example, by flattening the weights into a two dimensional matrix and extrapolating vectors for application to the columns and/or rows of the analog RPU arrays, where the weights themselves are ultimately programmed as a differential conductance of two RPU devices of an analog RPU array. In various embodiments, because the modifiers remain in digital on the set of analog RPU arrays, no conversion of the modifiers needs to take place.

Processing proceeds to operation S275, where I/O mod 355 instructs the set of analog RPU arrays to perform an analog inference task utilizing the updated set of weights and the updated set of modifiers. In some cases, I/O mod 355 also sends respective inputs for the analog inference task, and in other cases the inputs for the analog inference task originate from other parts of networked computers system 100 (or elsewhere).

Further details regarding the aforementioned features will now be discussed over the course of the following subsection.

III. FURTHER COMMENTS AND/OR EMBODIMENTS

Various embodiment of the present invention provide an analog RPU crossbar array having attached digital scales and biases per output. Various embodiments: (i) pre-train an DNN with a simulated RPU crossbar, learning the digital scales and biases via stochastic gradient descent; (ii) convert the weight from the pre-training to conductances, store the conductances on the RPU crossbar array, and load the learned scales and biases on the RPU crossbar array; and (iii) perform an analog inference task on the RPU crossbar array.

Various embodiments of the present invention optimize the weight to conductance conversion for DNN inference with RPU crossbar arrays using stochastic gradient descent and hardware-aware pre-training. These embodiments significantly improve accuracy for analog inference hardware, due to optimized conductance mapping using the digital output scales and biases that reduce overall resistive conductance noise requirements.

Generally speaking, analog DNN inference includes performing a forward pass (matrix vector operation) in analog, while a backward pass and an update pass are typically not needed for DNN inference. To map a floating point DNN to analog hardware, a pre-training (in digital) can be performed to make the DNN robust to (weight) noises, which results in an improvement to analog inference accuracy. After this hardware-aware (HWA) pre-training, weights from the digital weight matrix W can be transferred to analog conductances by converting to target conductances $G_T$ using, for example, the formula $g_{ij}=g_{max}w_{ij}/\max_{ij}|w_{ij}|$, where $g_{max}$ is a target maximal set state of the analog RPU devices and it is assumed that $g_{max}=0$. In this example, negative weights are programmed on the dedicated negative conductance of an available conductance pair per cross-point. By adjusting for the sign, the scale is identical for positive and negative weights and conductances and thus it can be assumed, for simplicity, that conductances are in the range—$g_{max}, \ldots, g_{max}$. The analog outputs of the analog RPU array can then be digitized and scaled to the relevant range in floating point.

Various embodiments of the present invention recognize the following facts, potential problems and/or potential areas for improvement with respect to current state of the art: (i) in existing configurations, because the output scales and weight range mapping are not done during the HWA pre-training, the mapping is not optimal for a particular DNN; and (ii) because the output range of the analog device is limited, ad-hoc weight mapping to conductances of existing configurations could cause overly large outputs that will get saturated, resulting in DNN inference accuracy degradation.

Various embodiments of the present invention optimize the output scales for an analog RPU crossbar array using SGD in the HWA pre-training.

Various embodiments include analog RPU array hardware that uses a programmable affine transform for each output, where the affine transform is represented by $a_iy_i+b_i$, where $y_i$ is the analog output of the i-th column of the RPU array, $a_i$ is a linear output scale, set according to the maximal weight for the i-th column, and $b_i$ is a bias used to correct for various offsets, such as the offset provided by an analog to digital (AD) conversion of the output of the i-th column. In various embodiments, $b_i$ is initially set to zero.

In various embodiments, $a_i$ and $b_i$ are stored in digital, and as such are stored in floating point. This applies even where $a_i$ and $b_i$ are stored on an otherwise analog device, as the analog device includes a digital compute unit for applying the scales to the outputs of the analog device.

Various embodiments of the present invention include the affine transform in the digital DNN architecture during HWA pre-training. Various embodiments start the pre-training by "virtually" mapping digital weights to the equivalent analog conductance range using $$\hat{w}_{ij} = \frac{g_{max} w_{ij}}{\max |w_{ij}|},$$

and by initially setting $a_i$ to scale from the maximal conductance value $g_{max}$ to the maximum weight, using $$a_i = \frac{\max_j |w_{ij}|}{g_{max}}.$$

In various embodiments, the digital DNN clips the output ranges and the weight ranges (e.g., using clip($\hat{W}$x−b,b) and clip ($\hat{W}_{ij}$, −$g_{max}$, $g_{max}$), respectively, where b is a bound value representing the maximal output value) as the output ranges and the weight ranges would occur in analog hardware using conductances.

In various embodiments, after initial mapping, SGD begins and the (thus scaled) W, $a_i$, and $b_i$ are tuned by the SGD process using various SGD algorithms.

In various embodiments, after approximately each epoch training, the weights are adjusted by remapping. For example, during the remapping: (i) $\mu_i = \max_j(|\hat{W}_{ij}^{current}|)$, $$\hat{w}_{ij}^{remapped} = \frac{\hat{w}_{ij}^{current}}{\mu_i}, \quad (ii)$$

and (iii) $a_i^{remapped} = \mu_i a_i^{current}$.

In various embodiments, for weight transfer to analog after HWA training has converged, the current $\hat{W}$ is programmed directly to conductances (i.e., without additional scaling) and the affine transforms for each output line are set to the current $a_i$ and $b_i$.

Figure 4:
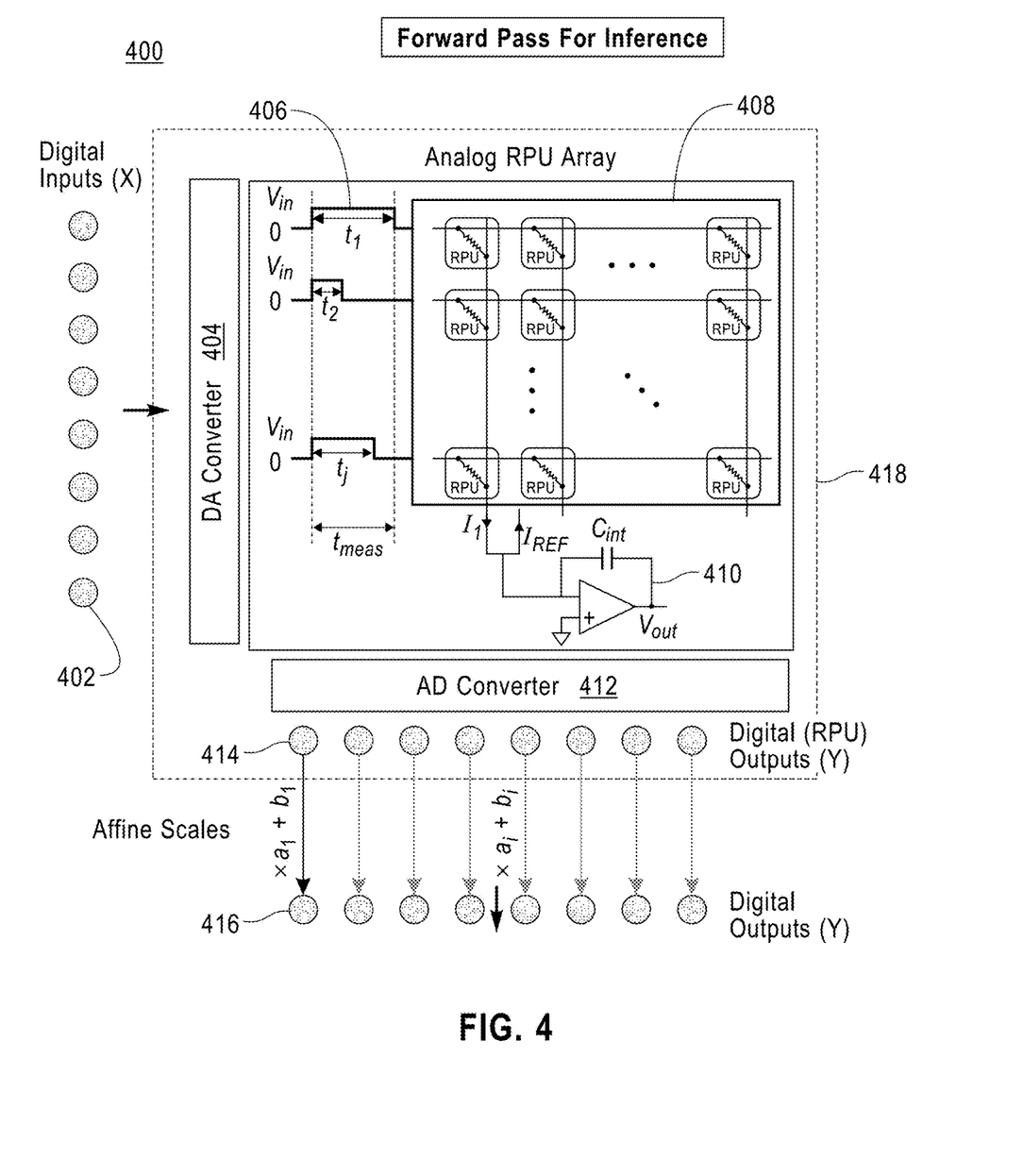
FIG. 4 is a diagram showing an analog RPU array system, in a forward pass for inference, according to an embodiment of the present invention.

FIG. 4 is a diagram depicting analog RPU array system 400, in a forward pass for inference, according to an embodiment of the present invention. In the embodiment depicted in FIG. 4, each of digital inputs 402 represents a separate digital input x to analog RPU array system 400. In the forward pass for inference, digital inputs 402 are converted by digital to analog (DA) converter 404 into respective analog input pulses 406, which are applied to the respective rows of RPU array 408. The analog outputs 410 of RPU array 408 are then converted by analog to digital (AD) converter 412 into digital RPU outputs 414, where each of digital RPU outputs 414 represents a separate digital FPU output y'. For each digital RPU output y', an affine scale—such as the affine scales described above—is applied, resulting in a respective digital output y of digital outputs 416. RPU hardware boundary 418 represents the boundary between the analog RPU hardware and the digital inputs and outputs that originate from and are sent outside of the analog RPU hardware, respectively.

Figure 5:
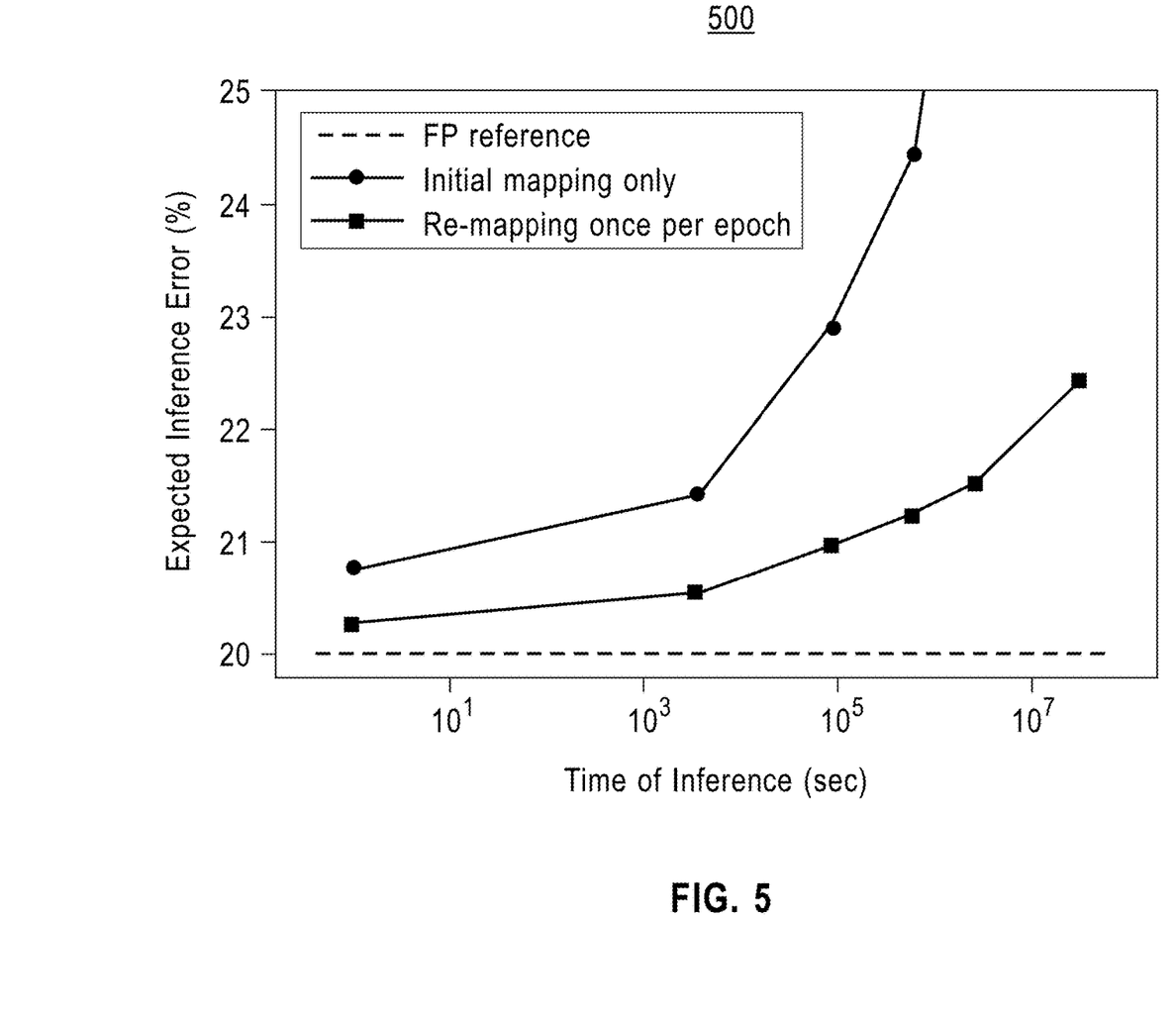
FIG. 5 is a graph demonstrating empirical verification of hardware aware pre-training methods. according to embodiments of the present invention.

FIG. 5 is a graph (i.e., graph 500) demonstrating empirical verification of hardware aware pre-training methods, according to embodiments of the present invention. As shown in FIG. 5, HWA pre-training with affine transform and remapping greatly improves the expected inference accuracy over a long period of time, particularly considering drift and drift compensation.

Some embodiments of the present invention recognize the following facts, potential problems and/or potential areas for improvement with respect to the current state of the art: (i) scales (if even available) are globally set and not trained to optimize the weight to conductance mapping for a particular analog RPU array, and (ii) no re-mapping of scales during training is performed.

Various embodiments of the present invention add digital scaling units to every analog tile of an analog RPU array to close the DNN accuracy gap based on practical device noise and circuit dynamic range limitations. Various embodiments automatically optimize such scaling factors during hardware-aware training for inference application. Furthermore, while various embodiments of the present invention describe applying such scaling factors to analog inference, various other embodiments apply similar methods and architectures to training algorithms, which may provide even further benefit given the typically stringent analog hardware requirements for training.

Various embodiments of the present invention may include one, or more, of the following features, characteristics and/or advantages: (i) training a mapping of conductance values to be stored on an inference crossbar array; (ii) training a weight matrix and scalar mapping factors for each output of an analog RPU array; (iii) assuming a fixed double element (DE) approach, and thus not constraining the weight matrix to be only positive (i.e., training only the weight range and not the entire distribution of +G vs. −G); and (iv) providing overall weight range optimization for the mapping of weight values to conductance values in an analog RPU array.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving, by one or more computer processors, a deep neural network (DNN) having a set of inputs nodes, a set of output nodes, and a set of weight parameters, wherein the DNN is digitally trained and stored;
configuring, by the one or more computer processors, the DNN for application to a set of analog resistive processing unit (RPU) arrays, the configuring including:
applying a set of modifiers to respective output nodes of the set of output nodes, wherein each modifier of the set of modifiers is applied to a respective corresponding output node of the set of output nodes, and wherein each modifier of the set of modifiers a corresponds and applies to a respective corresponding analog RPU array of the set of analog RPU arrays; and
digitally recreating an array configuration of the set of analog RPU arrays in one or more layers of the DNN;
training, by the one or more computer processors, the DNN using a training process, the training yielding an updated set of weight parameters and an updated set of modifiers;
converting, by the one or more computer processors, the updated set of weight parameters to a set of conductance values corresponding to the set of analog RPU arrays; and
transferring, by the one or more computer processors, the updated set of weight parameters and the updated set of modifiers to the set of analog RPU arrays.

2. The computer-implemented method of claim 1, wherein the converting is completed prior to the transferring the set of conductance values corresponding to the set of analog RPU arrays.

3. The computer-implemented method of claim 1, further comprising:
instructing, by the one or more computer processors, the set of analog RPU arrays to perform an analog inference task utilizing the updated set of weight parameters and the updated set of modifiers.

4. The computer-implemented method of claim 1, wherein the configuring further includes mapping the set of weight parameters to the set of conductance values corresponding to the set of analog RPU arrays.

5. The computer-implemented method of claim 4, wherein the training further includes, upon completion of a training epoch, remapping the set of weight parameters to an updated set of conductance values corresponding to the set of analog RPU arrays.

6. The computer-implemented method of claim 1, wherein the configuring further includes clipping a range of the set of output nodes and a range of the set of weight parameters according to a conductance range of a set of output nodes of the set of analog RPU arrays and a conductance range of a set of weights of the set of analog RPU arrays, respectively.

7. The computer-implemented method of claim 1, wherein the training process utilizes stochastic gradient descent.

8. The computer-implemented method of claim 1, wherein modifiers of the set of modifiers correspond to respective modifiers applied to respective output nodes of the set of analog RPU arrays.

9. The computer-implemented method of claim 1, wherein one or more modifiers of the set of modifiers are affine transformations.

10. The computer-implemented method of claim 9, wherein the set of modifiers include, for each output node of the set of output nodes, a respective linear scaling factor and a respective bias term.

11. A computer program product comprising one or more computer readable storage media and program instructions collectively stored on the one or more computer readable storage media, the program instructions executable by one or more computer processors to cause the one or more computer processors to:
receive a deep neural network (DNN) having a set of inputs nodes, a set of output nodes, and a set of weight parameters, wherein the DNN is digitally trained and stored;
configure the DNN for application to a set of analog resistive processing unit (RPU) arrays, the configuring including:
applying a set of modifiers to respective output nodes of the set of output nodes, wherein each modifier of the set of modifiers is applied to a respective corresponding output node of the set of output nodes, and wherein each modifier of the set of modifiers a corresponds and applies to a respective corresponding analog RPU array of the set of analog RPU arrays; and
digitally recreating an array configuration of the set of analog RPU arrays in one or more layers of the DNN;
train the DNN using a training process, the training yielding an updated set of weight parameters and an updated set of modifiers;
convert the updated set of weight parameters to a set of conductance values corresponding to the set of analog RPU arrays; and
transfer the updated set of weight parameters and the updated set of modifiers to the set of analog RPU arrays.

12. The computer program product of claim 11, wherein the converting is completed prior to the transferring the set of conductance values corresponding to the set of analog RPU arrays.

13. The computer program product of claim 11, the program instructions executable by one or more computer processors further causing the one or more computer processors to:
instruct the set of analog RPU arrays to perform an analog inference task utilizing the updated set of weight parameters and the updated set of modifiers.

14. The computer program product of claim 11, wherein one or more modifiers of the set of modifiers are affine transformations.

15. The computer program product of claim 14, wherein the set of modifiers include, for each output node of the set of output nodes, a respective linear scaling factor and a respective bias term.

16. A computer system comprising:
one or more analog resistive processing unit (RPU) arrays;
one or more computer processors; and
one or more computer readable storage media;
wherein:
the one or more computer processors are structured, located, connected and/or programmed to execute program instructions collectively stored on the one or more computer readable storage media; and the program instructions, when executed by the one or more computer processors, cause the one or more computer processors to:

receive a deep neural network (DNN) having a set of inputs nodes, a set of output nodes, and a set of weight parameters, wherein the DNN is digitally trained and stored;

configure the DNN for application to the one or more analog RPU arrays, the configuring including:

applying a set of modifiers to respective output nodes of the set of output nodes, wherein each modifier of the set of modifiers is applied to a respective corresponding output node of the set of output nodes, and wherein each modifier of the set of modifiers a corresponds and applies to a respective corresponding analog RPU array of the one or more analog RPU arrays; and digitally recreating an array configuration of the one or more analog RPU arrays in one or more layers of the DNN;

train the DNN using a training process, the training yielding an updated set of weight parameters and an updated set of modifiers;

convert the updated set of weight parameters to a set of conductance values corresponding to the one or more analog RPU arrays; and transfer the updated set of weight parameters and the updated set of modifiers to the one or more analog RPU arrays.

17. The computer system of claim 16, wherein the converting is completed prior to the transferring the set of conductance values corresponding to the one or more analog RPU arrays.

18. The computer system of claim 16, the program instructions, when executed by the one or more computer processors, further causing the one or more computer processors to:

instruct the one or more analog RPU arrays to perform an analog inference task utilizing the updated set of weight parameters and the updated set of modifiers.

19. The computer system of claim 16, wherein one or more modifiers of the set of modifiers are affine transformations.

20. The computer system of claim 19, wherein the set of modifiers include, for each output node of the set of output nodes, a respective linear scaling factor and a respective bias term.

* * * * *